United States Patent [19]

Fey et al.

[11] 4,150,248

[45] Apr. 17, 1979

[54] ARC HEATER WITH SILICON LINED REACTOR

[75] Inventors: Maurice G. Fey, Plum Borough; Frank G. Arcella, Bethel Park, both of Pa.

[73] Assignee: Westinghouse Electric Corp., Pittsburgh, Pa.

[21] Appl. No.: 884,885

[22] Filed: Mar. 9, 1978

[51] Int. Cl.² ............................................. H05B 7/00
[52] U.S. Cl. ..................................... 13/2 P; 75/10 R; 204/164
[58] Field of Search ................. 13/2, 2 P, 9; 75/10 R, 75/134 S; 204/164

[56] References Cited

U.S. PATENT DOCUMENTS

| 3,123,464 | 3/1964 | Casey et al. | 75/10 R |
| 4,080,194 | 3/1978 | Fey | 75/10 R |

Primary Examiner—R. N. Envall, Jr.
Attorney, Agent, or Firm—L. P. Johns

[57] ABSTRACT

An arc heater system for producing high purity silicon characterized by the use of an arc heater into which a silicon halide is injected together with a liquid metal reductant, such as an alkali metal, which are reacted together by projecting them into a reaction chamber to cause the formation of liquid silicon, and the walls containing the system being provided with cooling jacket means for preliminarily heating the reactants.

7 Claims, 3 Drawing Figures

ARC HEATER WITH SILICON LINED REACTOR

CROSS-REFERENCE TO RELATED APPLICATIONS

This application is related to the applications Ser. No. 757,546, filed Jan. 6, 1977 now U.S. Pat. No. 4,102,765 by Maurice G. Fey; Ser. No. 787,635, filed Apr. 14, 1977 now U.S. Pat. No. 4,102,767 by Robert Mazelsky et al; and Ser. No. 755,383, filed Dec. 29, 1976 now Pat. No. 4,102,764 by F. J. Harvey.

BACKGROUND OF THE INVENTION

1. Field of the Invention

This invention relates to a system for the production of high purity silicon by the use of an electric arc heater, and more particularly, it pertains to the provision of cooling jacket means for recovering heat generated by the system during operation.

2. Description of the Prior Art

In the utilization of an arc heater for high capacity production of low cost solar grade silicon, at rates of over 100 pounds/hour, there have been problems in providing for containing the minimum of 1800° C. reactions within a closed chemical reactor; preventing the molten silicon product from picking up contaminants of iron, aluminum, vanadium, titanium (ppb range) from the containment vessel structure; causing the molten silicon product to flow out of the reactor and not be swept out with volatile biproduct gases and vapors; and employing the reactor wall heat loss to preheat the liquid metal reductant.

SUMMARY OF THE INVENTION

In accordance with this invention, it has been found that the foregoing problems may be overcome by the system of this invention which comprises first housing means forming a reactor, an arc heater mounted on the housing for directing a plasma jet stream into the reactor, second housing means forming a silicon separator and communicating with the reactor, the silicon separator having downwardly extending walls, crucible means below said walls for collecting liquid silicon from said walls, first inlet means for introducing $SiCl_4$ into the plasma jet stream, second inlet means for introducing into the plasma jet stream a metal reductant selected from the group consisting of magnesium, sodium, potassium, and an alloy of sodium and potassium, first cooling jacket means in the first housing and communicating with the first inlet means, second cooling jacket means in the second housing means and communicating with the second inlet means, and the downwardly extending walls being lined with silicon.

The advantage of the arc heater system of this invention is that it provides for high capacity production of low cost solar grade silicon by employing the reactor wall heat loss to preheat the reacting materials.

DESCRIPTION OF THE PREFERRED EMBODIMENT

Figure 1:
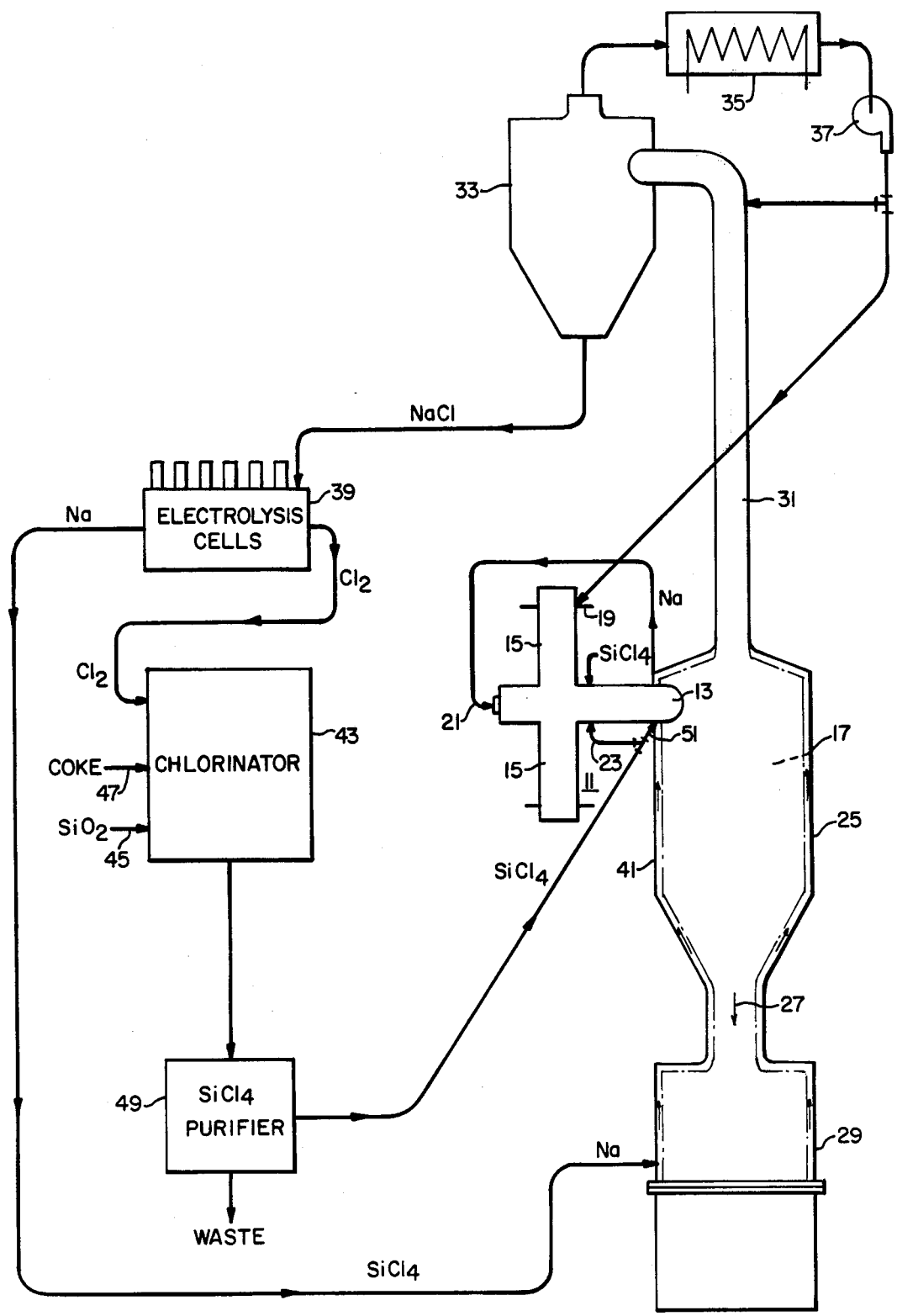
FIG. 1 is a flow diagram.

The chemical reaction involved in this invention is carried out in an arc heater system generally indicated at 11 (FIG. 3) and comprising generally tubular housing means forming a plenum chamber or reactor 13, at least one, and preferably a plurality of arc heaters 15, and other housing means forming a reaction chamber or silicon separator 17.

Arc gas, such as a mixture of argon and hydrogen, is introduced into the system through inlets 19 (FIG. 2) in the arc heaters 15. In addition, a liquid metal reductant selected from the group consisting of magnesium, sodium, potassium, is introduced into an inlet 21 into the plenum chamber 13. Downstream of the arc heaters 15 a silicon halide, such a silicon tetrachloride ($SiCl_4$), is introduced into an inlet 23 into the reactor 13, and the $SiCl_4$ merges into a plasma jet stream formed by the arc heaters 15 together with the sodium.

The reaction products (Si and NaCl) are projected from the reaction chamber to a suitable separator 25, such as a cyclone separator, wherein the silicon droplets flow downwardly as indicated by the arrow 27 into a silicon crucible 29. The vaporized coproducts including salt vapor (NaCl) leave the reactor 25 through outlet means 31 to enter a cyclone separator 33 for separating the gas and coproduct salt occurring during the reaction. The gas is transmitted to a heat exchanger 35 for cooling and is redirected by a pump 37 into the arc heaters at inlets 19. The salt (NaCl) leaves the lower end of the separator 33 from where it is conducted to an electrolysis cell 39 for disassociating the salt into its primary elements, such as sodium and chlorine. The elemental sodium is returned to the arc heater system and is preliminarily heated in a cooling jacket 41 surrounding the separator 25 and to be described hereinbelow.

The resulting chlorine from the cell 39 is conducted to a chlorinator 43 where, together with a silicon source such as metallurgical grade silicon or silicon dioxide is introduced at inlet 45 and a carbonaceous material, such as coke, introduced at inlet 47, reacts with the chlorine to produce silicon tetrachloride, as well as other products such as carbon dioxide. The silicon tetrachloride proceeds through a purifier 49 for the removal of any foreign materials, such as $FeCl_3$, from where the silicon tetrachloride is returned to the reactor 13 at an inlet 51. The silicon tetrachloride is heated in a cooling jacket 103 surrounding the reactor 13 and to be described hereinbelow.

Figure 2:
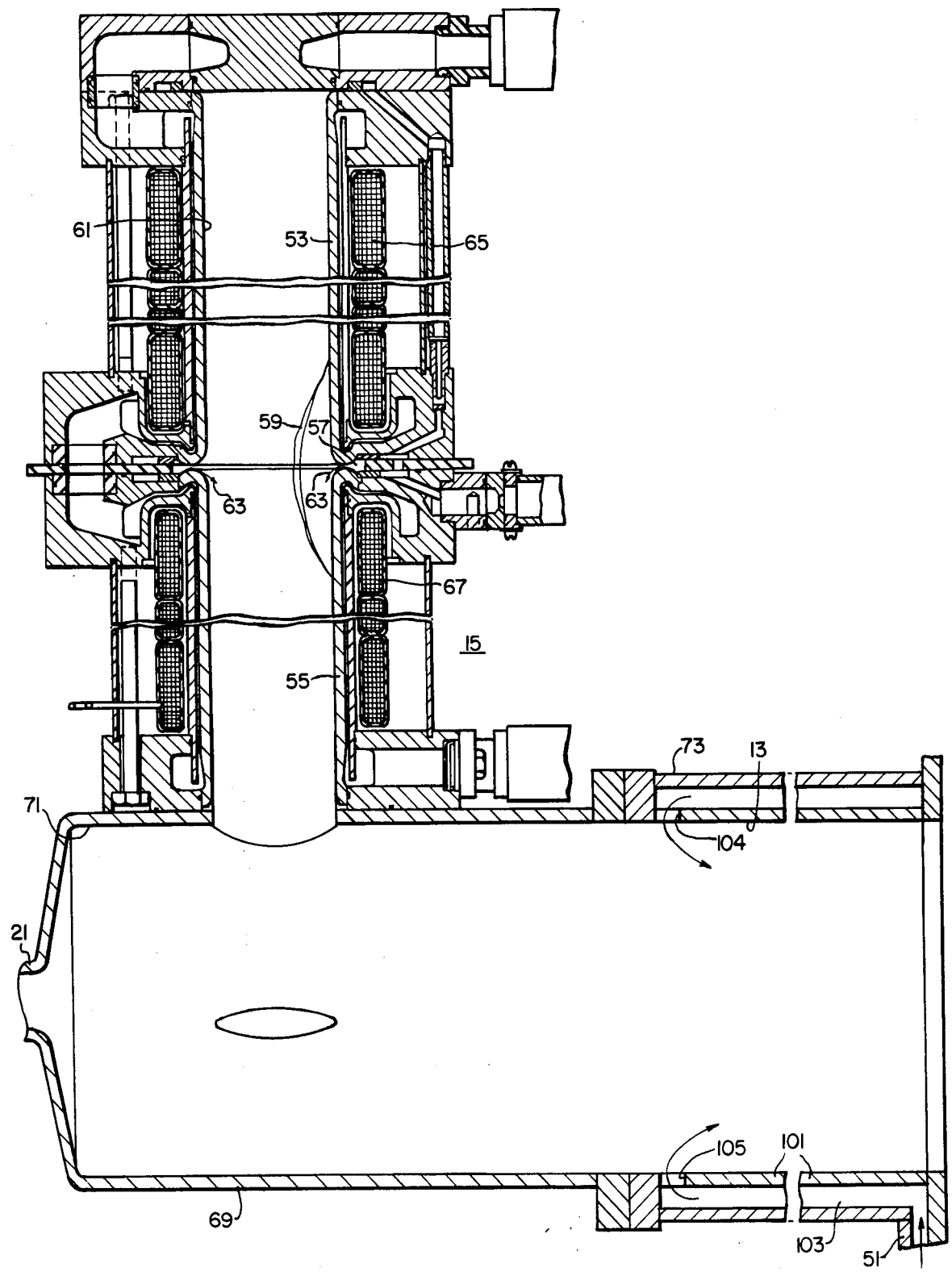
FIG. 2 is a vertical sectional view through an arc heater.
Figure 3:
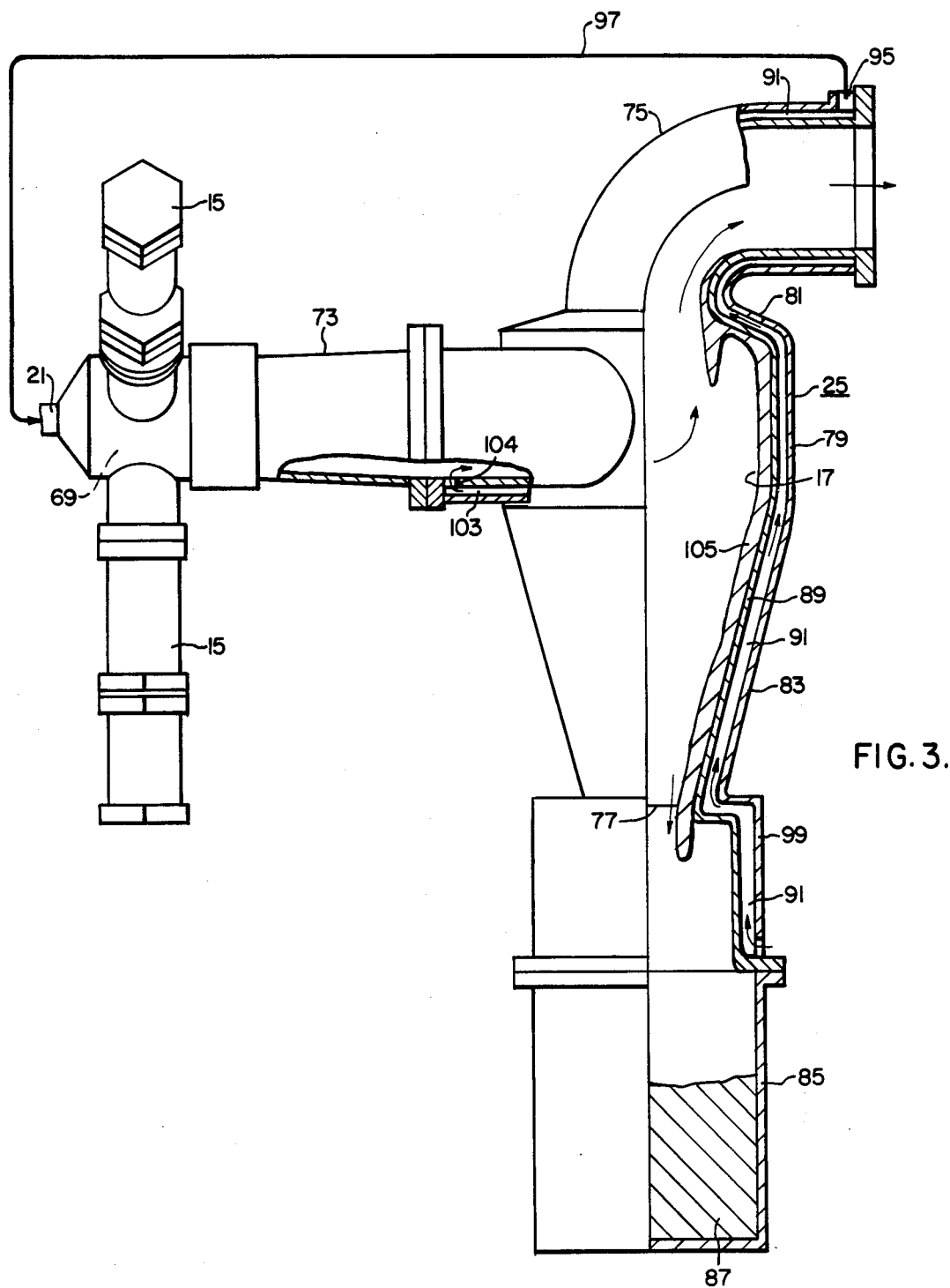
FIG. 3 is an elevational view, partly in section showing the assembly of the arc heater system and a cyclone separator and the silicon crucible.

As shown in FIG. 3, one or more and preferably three, arc heaters 15 are similar in construction and operation to that disclosed in U.S. Pat. No. 3,765,870, entitled "Method Of Direct Ore Reduction Using A Short Gap Arc Heater", of which the inventors are M. G. Fey and George A. Kemeny, and incorporated by reference as part hereof. Because of the full disclosure in that patent, the description of the arc heaters 15 is limited herein to the basic structure and operation. Each arc heater 15 (FIG. 2) is a single phase, self-stabilizing AC device capable of power levels up to about 3500 kilowatts or up to about 10,000 kilowatts for a three phase plant installation. In the practice of this invention, it is preferred that three arc heaters be provided, one for each of the three phases of the AC power supply.

As shown in FIG. 2, the arc heater 15 has two annular copper electrodes 53, 55 which are spaced at 57 about one millimeter apart to accommodate a line frequency power source of about 4 kV. An arc 59 occurs in the space or gap 57 and incoming feedstock gas 63 immediately blows the arc 59 from the space into the interior of the arc chamber 61. The feedstock gas 63 must be compatible with silicon and may be one of the gases selected from the group consisting of an inert gas, hydrogen, carbon monoxide, or a mixture thereof. The arc 59 rotates at a speed of about 1,000 rps by interaction of the arc current (several thousand amps AC) with a DC magnetic field set up by internally mounted field coils 65, 67. The velocities yield a very high operating efficiency for equipment of this type and the elongated arc 59 is utlimately projected by the gas downstream into the plenum chamber 13 and possibly the reaction chamber 17. The feedstock, including the sodium and $SiCl_4$ are introducted into the plenum chamber through inlets 21, 23, respectively, where they are heated to reaction conditions by the arc heated gas.

The reacting materials are halides of silicon, such as silicon tetrachloride ($SiCl_4$), and one of the alkali metals, such as sodium, which is preferred for economic reasons. When introduced into the downstream arc zone, the materials are injected through the inlet ports 21, 23 which react substantially as shown in the following formula:

$$SiCl_4 + 4Na \rightarrow Si + 4NaCl.$$

Manifestly, the formula is exemplary of the number of possibilities available for producing silicon, it being understood that silicon is introduced as a halide which reacts with the alkali metal to produce the reaction products indicated in the formula. For the foregoing reaction to successfully produce directly separable silicon, it must be produced in the molten state at a temperature greater than the boiling point of the coproduct salt (NaCl), whereby they are subsequently separated with the silicon in the liquid state and the salt in the gaseous state. The minimum reaction temperature for the foregoing formula must be above the boiling point of the salt, which temperature is about 1413° C. for sodium chloride. The maximum temperature is about 2600° K. (2327° C.).

As shown in FIGS. 2 and 3, the arc heaters 15 are mounted on a tubular member 69 and extend radially therefrom. The member 69 is preferably cylindrical and forms a chamber 71 which communicates with the reactor 13 of the conduit 73. The conduit 73 (FIG. 3) is connected to the separator 25 tangentially to enhance centrifugal separation of the light and heavy coproducts of the foregoing reaction, whereby the lighter gaseous products, such as the salts, leave the separator 25 through an outlet means 75; while the heavier element, silicon, exits through an outlet 77 at the lower end of the separator.

The separator 25 is contained between a peripheral wall 79 and opposite end walls 81, 83. The upper end wall 81 is preferably tapered upwardly from the peripheral wall 79 and joins the lower end of the conduit means 17 so that the coproduct gases are more readily directed from the reaction zone within the reactor 13 towards the outlet means. Similarly, the lower end wall 83 is inclined downwardly and joins the outlet 77 which communicates with a chamber formed by the crucible 29, wherein a silicon ingot 87 is collected.

In accordance with this invention, the separation chamber 17 is cooled by cooling jacket means comprising an inner wall 89 which is spaced from the outer walls 79, 81, 83 to provide a coolant compartment 91 which completely surrounds the reaction chamber 17. At the lower end of the end wall 83 an inlet 93 for liquid sodium is provided. The upper end of the compartment 91 extends into the outlet means 75 where a sodium outlet 95 is provided and connects to a conduit 97 which leads to the inlet 21 of the chamber 71 (FIG. 3). Although the lower end of the compartment (FIG. 3) is shown as terminating at the outlet 77, it may continue downwardly along the cover 99 of the crucible 85.

In a similar manner, in accordance with this invention, the conduit 73 is provided with an inner wall 101 to provide a cooling jacket 103 through which liquid $SiCl_4$ is circulated through inlet 51. Thus, the $SiCl_4$, having a boiling point at 57° C., is preheated in the jacket 103 before it is injected as vapor into the reactor 13 through coolant outlets 104 (FIG. 2).

Moreover, in accordance with this invention, as liquid silicon separates centrifugally in the chamber 17, it deposits upon the inner surface of the inner wall 89 where it solidifies to form a protective silicon liner 105 which extends preferably from the area of the outlet means 75 to the outlet 77. The layer 105 of solid silicon is necessary to avoid degradation of the solar grade silicon by contamination in ppb levels of iron, vanadium, aluminum, titanium, etc., which would otherwise be picked up from the structurals by the liquid silicon before dropping to the crucible 85. The processing arc or plasma jet stream generated by the arc heaters 15 projects into the reactor 13 to provide the forces necessary to project the silicon product on the inner wall 89. The additional byproduct NaCl vapors do not condense at the temperature, such as 1800° C., and are expelled with the reactor carrier gases ($H_2$). Thus, the solidified silicon layer 105 prevents molten silicon product from flowing over the reactor structure, such as the inner wall 89, and thereby avoids becoming chemically contaminated with parts per billion of the structural material. Accordingly, such structural material can be economically fabricated from iron base materials rather than more costly copper and nickel base materials, the latter materials in part per billion in silicon do not seriously reduce the photovoltaic efficiency of the silicon.

As a result of the coolant jackets for sodium and silicon tetrachloride, the wall heat loss is avoided by preheating the reactant materials prior to their introduction into the arc stream in the reactor 13.

An example of the process for sodium reduction from silicon tetrachloride is as follows.

EXAMPLE

The overall reaction in the arc heater reduction of $SiCl_4$ using sodium as a reductant is $$4\ Na(g) + SiCl_4(g) \rightarrow Si(l) + 4\ NaCl(g)$$

The standard free energy change for this reaction at temperatures above 1700° K., i.e., above the melting point of silicon and the boiling point of sodium chloride, is very negative and, therefore, the reaction should go to completion. For example, at 2200° K. the standard free energy change is −112.3 Kcal/mole Si. Similarly, the standard free energy change for the magnesium reduction is 2200° K. is −76.9 Kcal/mole. The theoretical energy requirement for the sodium reduction carried out at this temperature is 2.10 Kwhr/lb of Si for an arc heater operating at 75% efficiency and an initial reactant temperature of 25° C. This requirement refers to the process configuration in which the arc heater is operating directly on silicon tetrachloride. For the case in which a 66% $H_2$, 33% argon gas mixture is used as the heat transfer medium at an enthalpy level of 12,000 BTU's/lb, then 0.515 lbs. of the hydrogen-argon mixture is required per pound of silicon. If the hydrogen-argon mixture exits, the reduction reactor at 2200° K. and all sensible heat in the gas is lost, and the overall energy requirement is 2.41 Kw-hr/lb of Si at 75% arc heater efficiency. Similar calculations show that the theoretical energy requirement for magnesium reduction is 1.42 kw-hr/lb of Si at 75% arc heater efficiency for direct feed of $SiCl_4$ into the arc heater while the use of a 66% $H_2$, 33% Ar arc heater gas requires 1.63 kw-hr/lb of Si at 75% efficiency.

The chlorination and electrolysis steps of the proposed process will also require energy input. For example, the sodium regeneration step requires 7.5 kw-hr/lb of sodium (24.6 kw-hr/lb of Si), while magnesium requires 9 kw-hr/lb of magnesium (15.6 kw-hr/lb of Si). The energy requirement for the chlorination step will depend on the composition of the silica-bearing starting material, the carbon source and the chlorination temperature.

The raw materials requirements are 2.14 lbs silica per pound of silicon, a minimum of 0.86 lbs. of carbon, and make-up sodium or magnesium chloride and arc heater heat transfer gas as appropriate.

Finally, though the silicon is preferably separated centrifugally, other means such as by condensation in a condensation chamber may be also used.

Accordingly, the reactor of the present invention provides for a unique assembly of an arc heater and reaction chamber which is suitable for either single phase or three phase operation, i.e. for three or six arc heaters the latter of which have two phases. Finally, an arc heater and reaction chamber design which in the case of exothermic reaction, provides the utilization of at least part of the heat of reaction in preheating the reactants.

What is claimed is:

1. An arc heater system for the production of solar grade silicon, comprising first housing means having a plenum chamber, an arc heater mounted on the housing for directing a plasma jet stream into the plenum chamber, second housing means forming a reaction chamber, the plenum chamber communicating with the reaction chamber, the reaction chamber having downwardly extending walls, crucible means below said walls for collecting liquid silicon from said walls, at least one of the first and second housing means comprising cooling jacket means, first inlet means for introducing a silicon halide into the plasma jet stream, second inlet means for introducing into the plasma jet stream a liquid metal reductant selected from the group consisting of magnesium, sodium, potassium, one of the first and second cooling jacket means communicating with one of the first and second inlet means, and the other of the first and second cooling jacket means communicating with the other of the inlet means.

2. The arc heater system of claim 1 in which the first cooling jacket communicates with the first inlet means.

3. The arc heater system of claim 1 in which the second cooling jacket communicates with the second inlet means.

4. The arc heater system of claim 2 in which the second cooling jacket communicates with the second inlet means.

5. The arc heater system of claim 1 in which the liquid metal reductant is sodium.

6. The arc heater system of claim 2 in which the silicon halide source is silicon tetrachloride.

7. The arc heater system of claim 1 in which the downwardly extending walls are lined with silicon.

* * * * *